No. 644,630. Patented Mar. 6, 1900.
J. PEARSON.
NUT LOCK.
(Application filed Mar. 9, 1899.)
(No Model.)
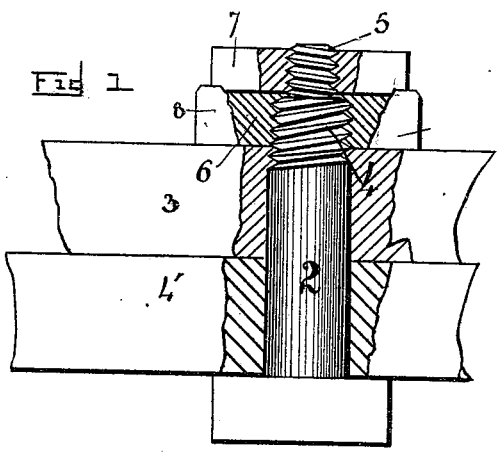
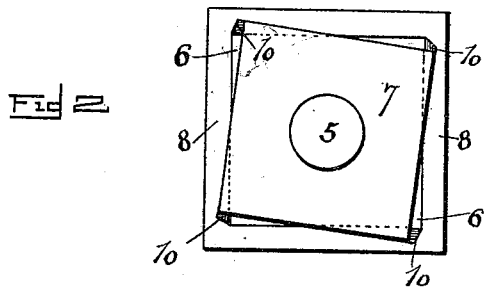
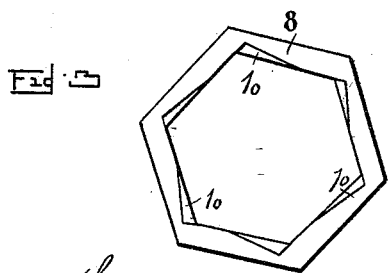
WITNESSES:
M. Clarey.
M. A. Dodsworth
John Pearson
INVENTOR
BY C. W. Sues
ATTORNEY.

UNITED STATES PATENT OFFICE.

JOHN PEARSON, OF OMAHA, NEBRASKA.

NUT-LOCK.

SPECIFICATION forming part of Letters Patent No. 644,630, dated March 6, 1900.

Application filed March 9, 1899. Serial No. 708,426. (No model.)

*To all whom it may concern:*

Be it known that I, JOHN PEARSON, residing at Omaha, in the county of Douglas and State of Nebraska, have invented certain useful Improvements in Swing Nut-Locks; and I do hereby declare that the following is a full, clear, and exact description thereof, such as will enable others skilled in the art to which it appertains to make and use the same, reference being had to the accompanying drawings, which form a part of this specification.

This invention has relation to a novel improvement in nut-locks.

The object of my invention is to provide a simple device by means of which a nut may be securely locked upon a bolt, and in furthering the aim of my invention I provide a suitable keeper adapted to be used in connection with a suitable nut adapted to lock said nut.

In the accompanying drawings I have shown in Figure 1 a view, part in section and with portions broken away, of a bolt provided with my improved nut-lock. Fig. 2 shows a top view of a nut locked by means of my keeper, while Fig. 3 shows one of my keepers as detached and constructed to be used in connection with a hexagonal nut.

In the accompanying drawings, 2 represents an ordinary bolt which is provided with the right-handed screw-thread 4 and a left-handed screw-thread 5, the thread 5 being upon a portion of the bolt of a diameter less than the bolt proper. This bolt 2 in the drawings is represented as securing the two sections 3 and 4'. In doing this I first thread an ordinary rectangular nut 6 upon the thread 4 until the two parts 3 and 4' are tightly united. After this nut is in position I thread the nut 7 upon the thread 5 in an opposite direction until both of the nuts coincide, so that their four outer sides come in like planes. I then drop a keeper over the upper nut until it strikes the upper surface of the object to be secured, and this keeper is of a length slightly exceeding the length of the lower nut, upon which it fits in frictional contact; but this keeper is provided with removed portions 10, as is shown in Fig. 2, which are angular and which permit the upper nut 7 being unlocked a suitable distance until the upper nut strikes the vertical portion of the seating within the keeper. In Fig. 2 I have shown the upper nut 7 as partially unwound, so as to carry this upper nut beyond the lower nut 6, so that this upper nut is held partially unwound within the seating 10 of the keeper. Now it is simply impossible for the upper nut 7 to unwind, for the reason that the shoulders of the seating 10 form a secure stop at four points to this upper nut 7 and so lock the upper nut in a partially-unwound condition. As the lower nut threads in a direction opposite to the upper nut, it is of course seen that the only way to unlock two nuts secured by means of my improved keeper would be to thread the upper nut upon its bolt, so that the upper nut would coincide with the lower, and then remove the keeper 8, which is preferably held in frictional contact upon the lower nut. The keeper is then removed, when the two nuts can be readily unwound.

In place of providing a bolt with a right and left handed thread the same may be provided with an ordinary washer of a size corresponding to the size of the nut, and which washer is to be fixed either to the bolt or to the upper surface of the article upon which it binds, when the nut proper may be threaded upon this square washer. The keeper, which is adapted to snugly encompass the washer, is then placed in position, when the nut is partially unwound, so that it may lock within the seatings of the keeper. It is of course understood that the horizontal surface of the angular seating 10 comes slightly below the lower surface of the upper nut, so that this upper nut may always readily work into this seating, where it is held.

Having thus described my said invention, what I claim as new, and desire to secure by United States Letters Patent, is—

A nut-lock comprising a bolt, having a right and left handed thread, two nuts of like conformation, one adapted to fit upon said right, and one upon said left handed thread, and a keeper adapted to bind upon said lower nut, and provided with a plurality of seatings, so that as said upper nut is partially unscrewed it rises within and engages said seatings, as and for the purpose set forth.

Signed in the presence of two witnesses.

JOHN PEARSON.

Witnesses:
GEORGE W. SUES,
MABEL A. DODSWORTH.